United States Patent
Gujarathi

(10) Patent No.: US 11,245,683 B2
(45) Date of Patent: Feb. 8, 2022

(54) SINGLE-SIGN-ON FOR THIRD PARTY MOBILE APPLICATIONS

(71) Applicant: CITRIX SYSTEMS, INC., Fort Lauderdale, FL (US)

(72) Inventor: Ashish Gujarathi, Parkland, FL (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 466 days.

(21) Appl. No.: 16/028,515

(22) Filed: Jul. 6, 2018

(65) Prior Publication Data

US 2020/0014680 A1 Jan. 9, 2020

(51) Int. Cl.
*H04L 29/06* (2006.01)
*H04W 12/06* (2021.01)

(52) U.S. Cl.
CPC ...... *H04L 63/0815* (2013.01); *H04L 63/0272* (2013.01); *H04L 63/0823* (2013.01); *H04L 63/0853* (2013.01); *H04L 63/0876* (2013.01); *H04W 12/06* (2013.01)

(58) Field of Classification Search
CPC ............. H04L 63/0272; H04L 63/0815; H04L 63/0823; H04L 63/0853; H04L 63/0876; H04W 12/06
See application file for complete search history.

(56) References Cited

U.S. PATENT DOCUMENTS

| | | | | |
|---|---|---|---|---|
| 8,776,209 B1* | 7/2014 | Kumar | ................ | H04L 63/0272 726/12 |
| 2008/0222628 A1* | 9/2008 | Batra | ................. | G06F 9/44526 717/171 |
| 2014/0047532 A1* | 2/2014 | Sowatskey | .............. | G06F 21/31 726/10 |
| 2014/0181944 A1* | 6/2014 | Ahmed | ............... | H04W 12/068 726/8 |
| 2014/0366080 A1* | 12/2014 | Gupta | .................... | H04L 63/20 726/1 |
| 2015/0195285 A1* | 7/2015 | Pugh | ...................... | H04L 67/10 726/1 |
| 2016/0094543 A1* | 3/2016 | Innes | .................... | H04L 9/3234 726/6 |
| 2016/0094546 A1* | 3/2016 | Innes | ..................... | G06F 21/33 713/156 |
| 2016/0292694 A1* | 10/2016 | Goldschlag | ......... | H04L 63/0272 |
| 2017/0063839 A1* | 3/2017 | Barton | .................... | H04L 63/20 |

(Continued)

OTHER PUBLICATIONS

Alessandro Armando et al., Formal Analysis of SAML 2.0 Web Browser Single Sign-On, Oct. 2008, ACM, pp. 1-10. (Year: 2008).*

(Continued)

*Primary Examiner* — Luu T Pham
*Assistant Examiner* — Fahimeh Mohammadi
(74) *Attorney, Agent, or Firm* — Allen, Dyer, Doppelt + Gilchrist, PA

(57) ABSTRACT

A mobile computing device is configured to allow a user to launch native SaaS applications from different vendors using a single-sign-on without having to modify or hook the native SaaS applications. A VPN application operates as man-in-the-middle (MITM) for identity provider requests from SaaS services. The VPN application is initially authenticated with the identity provider, and receives an IDP authentication token which is stored. The IDP authentication token is used for authentication requests from SaaS services.

17 Claims, 6 Drawing Sheets

(56) References Cited

U.S. PATENT DOCUMENTS

| | | | | |
|---|---|---|---|---|
| 2017/0279803 A1* | 9/2017 | Desai | ............... | H04L 63/0884 |
| 2017/0331815 A1* | 11/2017 | Pawar | ............... | H04L 63/083 |
| 2018/0115547 A1* | 4/2018 | Peterson | ............ | H04L 63/029 |
| 2018/0131685 A1* | 5/2018 | Sridhar | ............... | H04L 67/28 |
| 2018/0262484 A1* | 9/2018 | Kesari | ................. | H04L 51/22 |

OTHER PUBLICATIONS

Terry Fleury et al., Single Sign-On for Java Web Start Applications Using MyProxy, Nov. 2006, ACM, pp. 95-102. (Year: 2006).*

Christian Mainka et al, SoK: Single Sign-On Security—An Evaluation of OpenID Connect, Apr. 26-28, 2017, IEEE, pp. 251-266. (Year: 2017).*

Maicon Stihler et al., Integral Federated Identity Management for Cloud Computing, May 7-10, 2012, IEEE, pp. 1-5. (Year: 2012).*

* cited by examiner

SINGLE-SIGN-ON FOR THIRD PARTY MOBILE APPLICATIONS

TECHNICAL FIELD

The present disclosure relates to mobile computing devices, and more particularly, to single-sign-on for native SaaS applications on a mobile computing device.

BACKGROUND

End-users typically access multiple SaaS services from their mobile computing devices using native mobile applications instead of a browser. This requires the end user to enter the same credentials to launch each native mobile application on a mobile computing device. Since different independent software providers provide the native mobile applications, the native mobile applications are not able to share assets required to authenticate to an identity provider.

SUMMARY

A mobile computing device includes a memory and a processor cooperating with the memory and configured to launch a first native SaaS application based on user input, launch a VPN application in response to the first native SaaS application being launched, and operate the VPN application to authenticate with an identity provider (IDP). The identity provider provides an IDP authentication token to the VPN application upon authentication.

The first native SaaS application is operated to access a first SaaS service, with the first SaaS service redirecting the first native SaaS application to the identity provider for authentication. The VPN application is operated to intercept traffic from the first native SaaS application to the identity provider, with the VPN application modifying the traffic by inserting the IDP authentication token to be presented to the identity provider without requiring the user to login for authentication. The identity provider provides a first native SaaS application access token to the VPN application upon authentication. The VPN application then provides the first SaaS application access token to the first native SaaS application. The first native SaaS application is operated to provide the first SaaS application access token to the first SaaS service to complete authentication.

The mobile computing device advantageously allows a user to launch native SaaS applications from different vendors using a single-sign-on without having to modify or hook the native SaaS applications. The VPN application is advantageously configured to operate as man-in-the-middle (MITM) for identity provider requests from SaaS services. The VPN application is initially authenticated with the identity provider, and receives the IDP authentication token which is used for subsequent authentication requests from SaaS services. This corresponds to the single-sign-on for the user.

The processor is further configured to launch a second native SaaS application based on user input, and operate the second native SaaS application to access a second SaaS service, with the second SaaS service redirecting the second native SaaS application to the identity provider for authentication. The VPN application is operated to intercept traffic from the second native SaaS application to the identity provider, with the VPN application modifying the traffic by inserting the IDP authentication token to be presented to the identity provider without requiring the user to login for authentication. The identity provider provides a second SaaS application access token to the VPN upon authentication. The VPN application then provides the second SaaS application access token to the second native SaaS application. The second native SaaS application is operated to provide the second SaaS application access token to the second SaaS service to complete authentication.

If a session for the first native SaaS application has expired, then the processor is further configured to re-launch the first native SaaS application based on user input, and operate the first native SaaS application to access the first SaaS service, with the first SaaS service redirecting the first native SaaS application to the identity provider for re-authentication. The VPN application is operated to intercept traffic from the first native SaaS application to the identity provider, with the VPN application modifying the traffic by inserting the IDP authentication token to be presented to the identity provider without requiring the user to login for authentication. The identity provider provides a new first SaaS application access token to the VPN upon authentication, and the VPN application then provides the new first SaaS application access token to the first native SaaS application. The first native SaaS application is operated to provide the new first SaaS application access token to the first SaaS service to complete re-authentication.

The VPN application uses a client certificate to authenticate with the identity provider so as to receive the IDP authentication token. Alternatively, the VPN application uses the user's login information to authenticate with the identity provider so as to receive the IDP authentication token.

The processor operates the VPN application so that the VPN application only intercepts traffic directed to the identity provider while passing traffic for other destinations as is. The VPN application presents a server certificate of the identity provider when intercepting traffic from the native first and second SaaS applications.

The traffic is based on a secure sockets layer (SSL) protocol. The mobile computing device is enrolled with a mobile device management (MDM) service.

Another aspect is directed to a method for operating a mobile computing device comprising launching a first native SaaS application based on user input, launching a VPN application in response to the first native SaaS application being launched, and operating the VPN application to authenticate with an identity provider (IDP). The identity provider provides an IDP authentication token to the VPN application upon authentication. The first native SaaS application is operated to access a first SaaS service, with the first SaaS service redirecting the first native SaaS application to the identity provider for authentication.

The VPN application is operated to intercept traffic from the first native SaaS application to the identity provider, with the VPN application modifying the traffic by inserting the IDP authentication token to be presented to the identity provider without requiring the user to login for authentication. The identity provider provides a first native SaaS application access token to the VPN application upon authentication. The VPN application then provides the first SaaS application access token to the first native SaaS application. The first native SaaS application is operated to provide the first SaaS application access token to the first SaaS service to complete authentication.

Yet another aspect is directed to a non-transitory computer readable medium for operating a mobile computing device, and with the non-transitory computer readable medium having a plurality of computer executable instructions for causing the mobile computing device to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
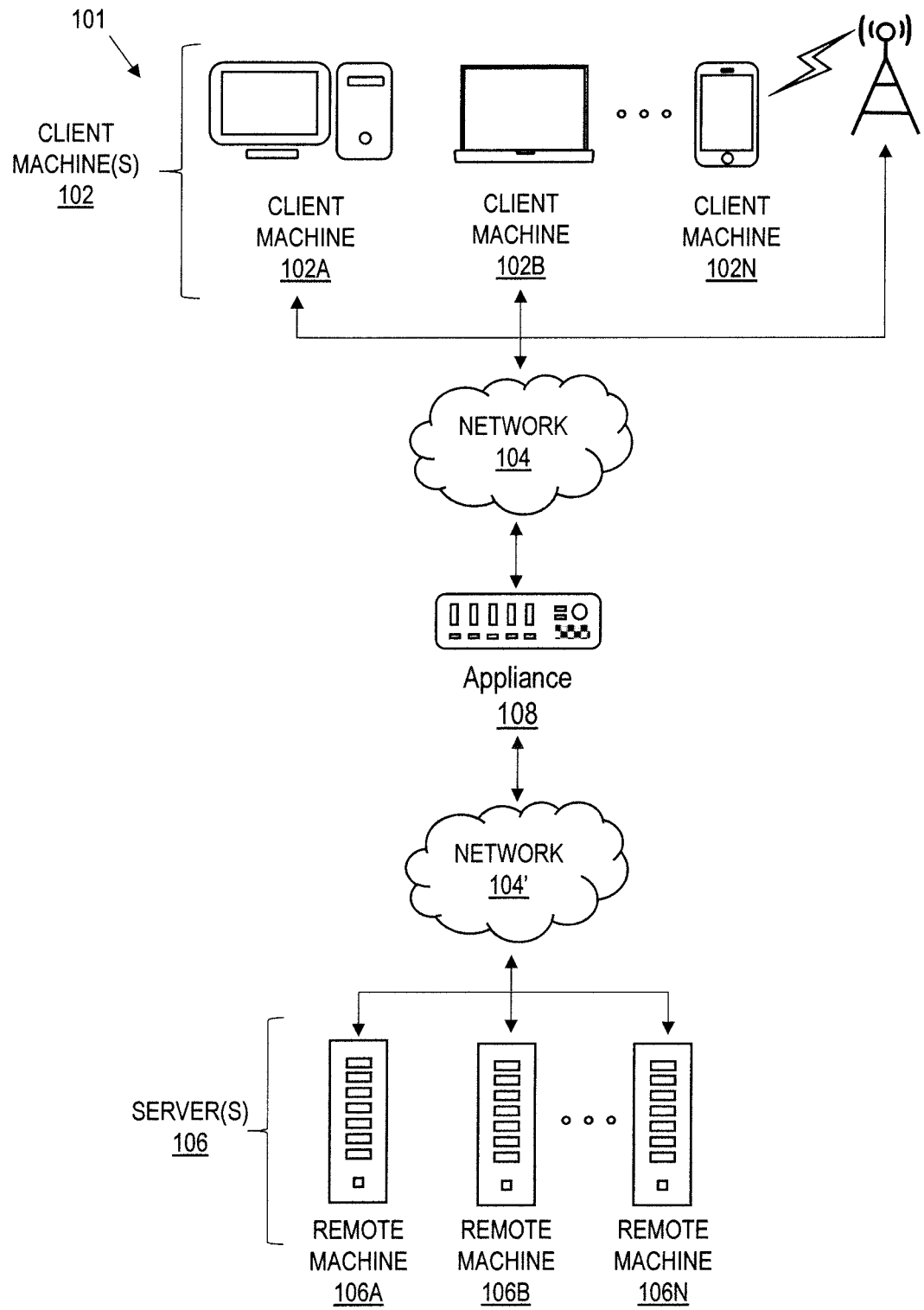
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
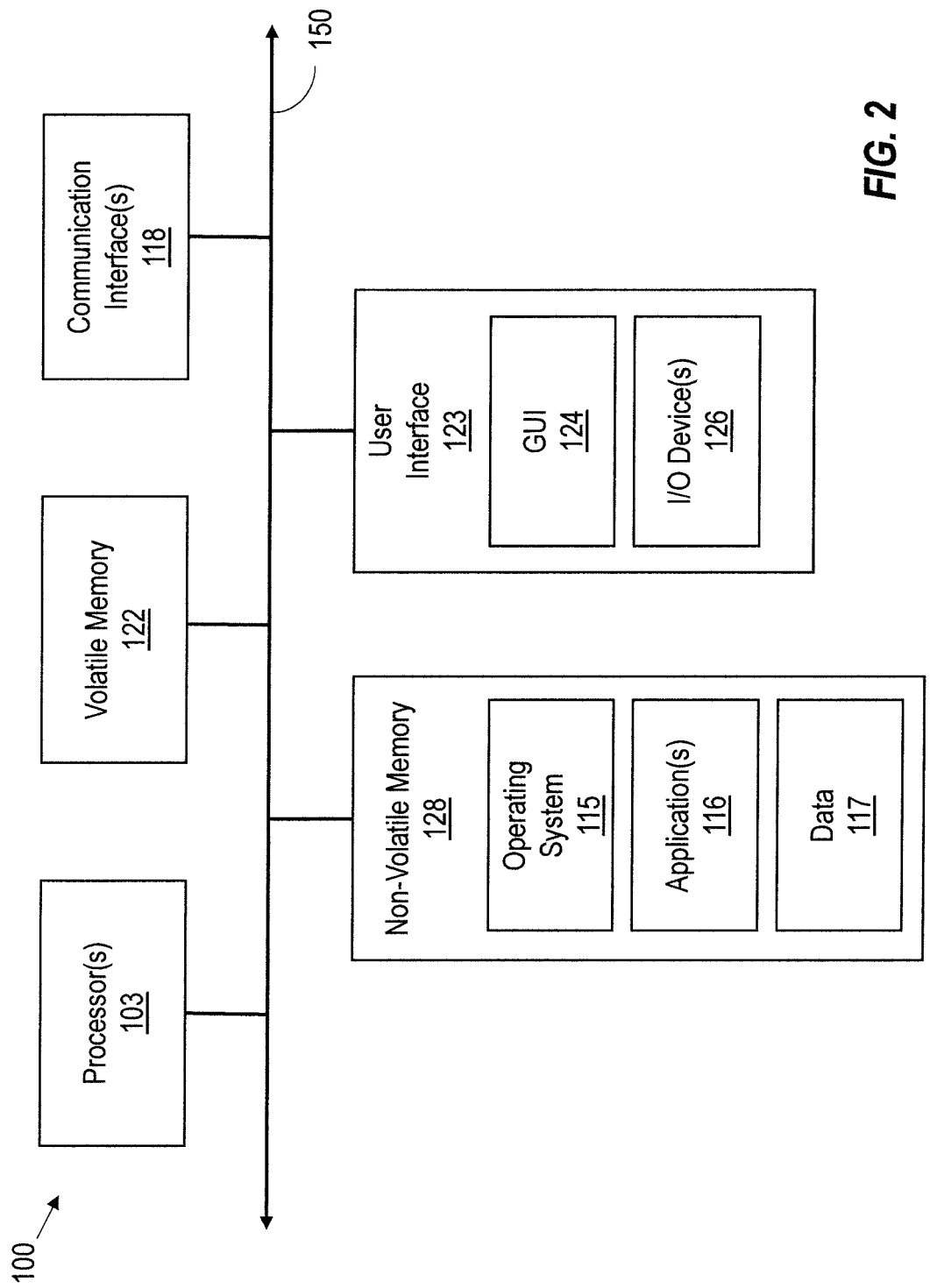
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
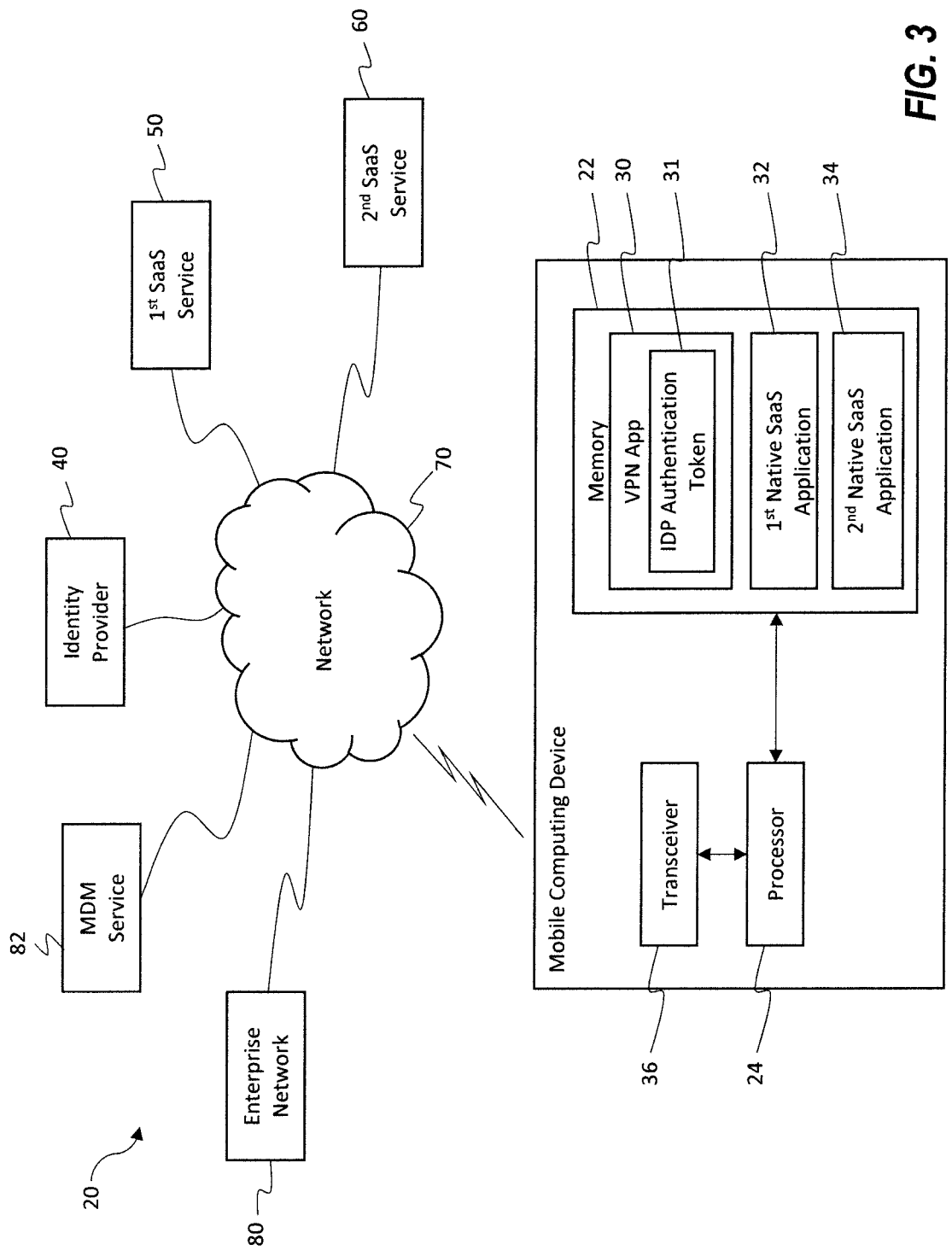
FIG. 3 is a block diagram of a mobile computing device with a VPN application that uses an IDP authentication token for authentication requests by SaaS services in which various aspects of the disclosure may be implemented.

Referring initially to FIG. 3, a mobile computing device 20 includes a memory 22 and a processor 24 cooperating with the memory 22. The memory 22 includes a virtual private network (VPN) application 30, and a plurality of native software as a service (SaaS) applications. The native SaaS applications include a first native SaaS application 32 and a second native SaaS application 34, for example. A transceiver 36 is coupled to the processor 24 for wirelessly communicating with a network 70.

As will be explained in detail below, the mobile computing device 20 advantageously allows a user to launch native SaaS applications from different vendors using a single-sign-on without having to modify or hook the native SaaS applications. Also, tunneling application traffic through a VPN is not required.

The processor 24 is configured to launch the first native SaaS application 32 based on user input, and launch the VPN application 30 in response to the first native SaaS application 32 being launched. The processor 24 operates the VPN application 30 to authenticate with an identity provider (IDP) 40, with the identity provider 40 providing an IDP authentication token 31 to the VPN application 30 upon authentication.

The processor 24 operates the first native SaaS application 32 to access a first SaaS service 50, with the first SaaS service 50 redirecting the first native SaaS application 32 to the identity provider 40 for authentication. The VPN application 30 is operated by the processor 24 to intercept traffic from the first native SaaS application 32 to the identity provider 40. The VPN application 30 modifies the traffic by inserting the IDP authentication token 31 to be presented to the identity provider 40 without requiring the user to login for authentication.

The identity provider 40 provides a first SaaS application access token to the VPN application 30 upon authentication. The VPN application 30 then provides the first SaaS application access token to the first native SaaS application 32. The processor 24 operates the first native SaaS application 32 to provide the first SaaS application access token to the first SaaS service 50 to complete authentication.

The VPN application 30 is advantageously configured to operate as man-in-the-middle (MITM) for identity provider requests from SaaS services, such as the first and second SaaS services 50, 60. The VPN application 30 is initially authenticated with the identity provider 40, and receives an IDP authentication token 31 which is used for authentication requests from the first and second SaaS services 50, 60. This corresponds to the single-sign-on for the user.

When the VPN application 30 subsequently intercepts traffic from the first or second native SaaS applications 32, 34 to the identity provider 40, the IDP authentication token 31 is inserted into the traffic. This allows the VPN application 31 to authenticate with the identity provider 40. The identity provider 40 then generates a SaaS application access token for the requesting SaaS service without challenging the user for authentication. This is repeated for each additional native SaaS application that is launched, or when a session associated with a native SaaS application that has already been launched has expired.

For example, the processor 24 is further configured to launch the second native SaaS application 34 based on user input. The second native SaaS application 34 is operated to access the second SaaS service 60, with the second SaaS service 60 redirecting the second native SaaS application 34 to the identity provider 40 for authentication.

The processor 24 operates the VPN application 30 to intercept traffic from the second native SaaS application 60 to the identity provider 40, with the VPN application 30 modifying the traffic by inserting the IDP authentication token 31 to be presented to the identity provider 40 without requiring the user to login for authentication. The identity provider 40 provides a second SaaS application access token to the VPN application 30 upon authentication. The VPN application 30 then provides the second SaaS application access token to the second native SaaS application 34. The second native SaaS application 34 is operated to provide the second SaaS application access token to the second SaaS service 60 to complete authentication.

Typically, mobile computing devices 20 that interface with an enterprise network 80 are required to be enrolled or registered with a mobile device management (MDM) service 82. This allows each mobile computing device 20 to access applications and services with their organization's enterprise network 80. These applications may be delivered to each mobile computing device 20 by the MDM service.

An MDM enrolled mobile computing device 20 is able to receive delivery of certificates from the MDM service. One of the certificates may be a root certificate that identifies a root certificate authority (CA) used by an MDM server for issuing client certificates and server certificates.

A client certificate can be used by the VPN application 30 to authenticate with the identity provider 40. If a client certificate is not received from the MDM server, then as an alternative, the user would authenticate to the identity provider 40 using their credentials, i.e., username and password. The VPN application 30 presents a server certificate of the identity provider when intercepting traffic from the first and second native SaaS applications 32, 34. The traffic is based on a secure sockets layer (SSL) protocol.

Figure 4:
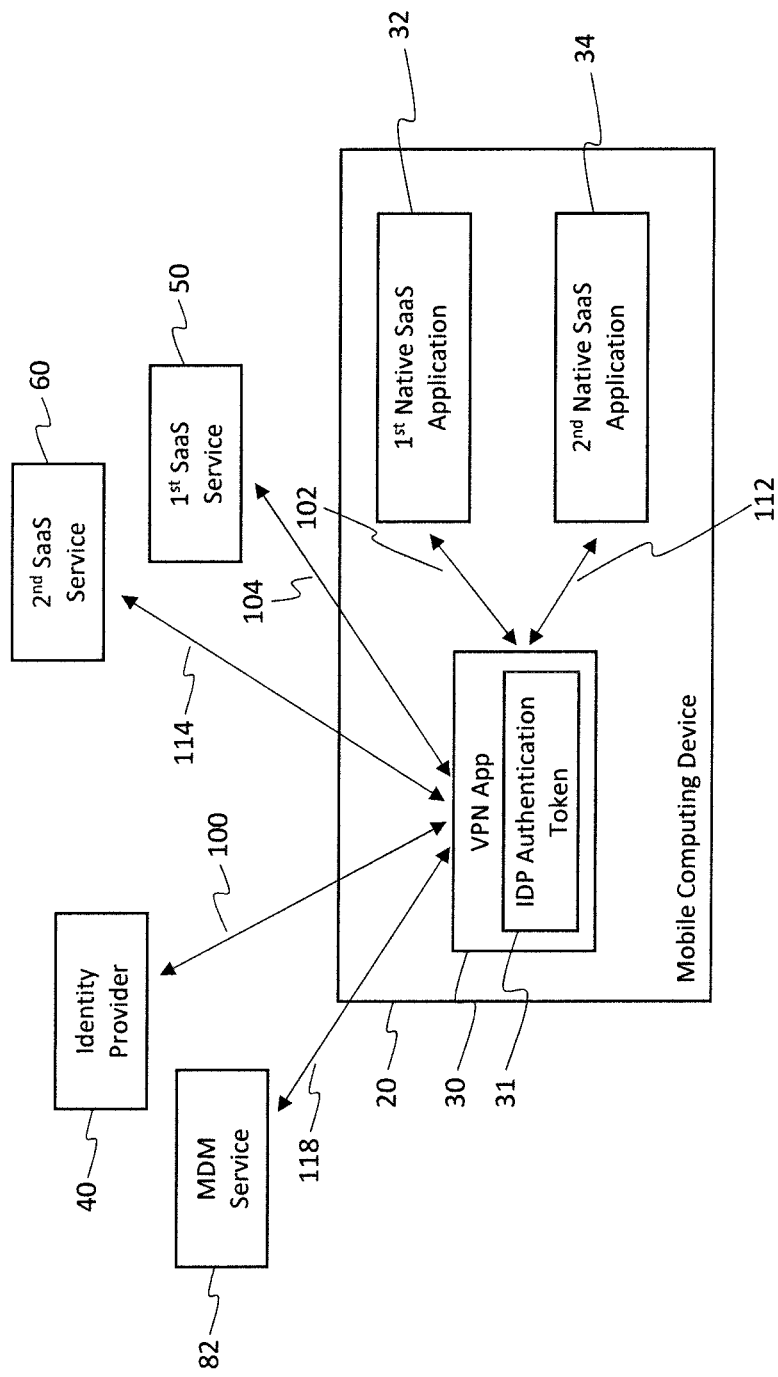
FIG. 4 is a simplified block diagram of the mobile computing device illustrated in FIG. 3 showing interactions with the identity provider and SaaS services.

Interaction of the mobile computing device 20 with the MDM service 82, the identity provider 40, and the first and second SaaS services 50, 60 is provided in FIG. 4. These interactions will be referenced while discussing the general flowchart 120 provided in FIG. 5 and the more detailed flowchart 170 in FIG. 6 illustrating a method for operating the mobile computing device 20.

Figure 5:
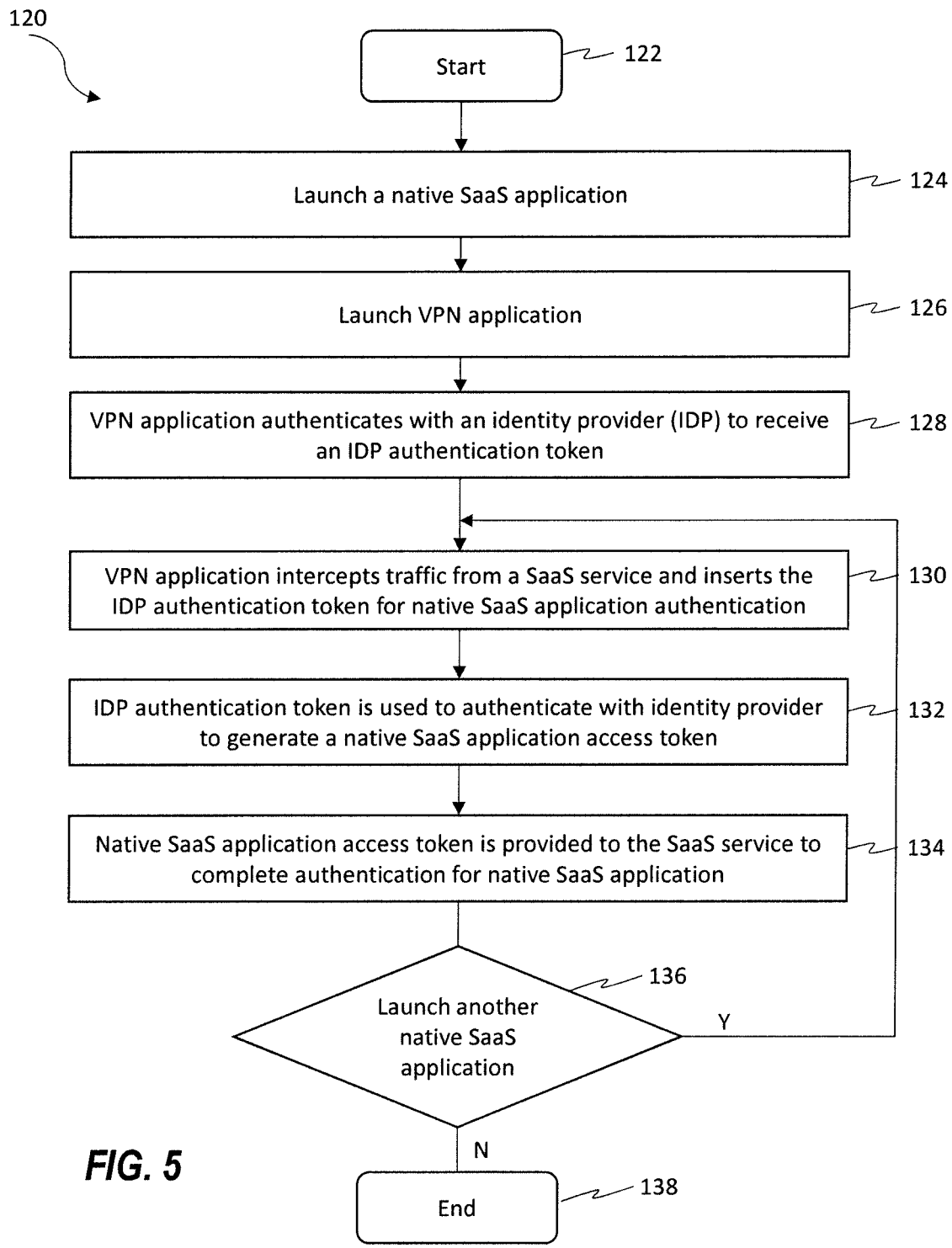
FIG. 5 is a general flowchart illustrating a method for operating the mobile computing device illustrated in FIG. 3.
Figure 6:
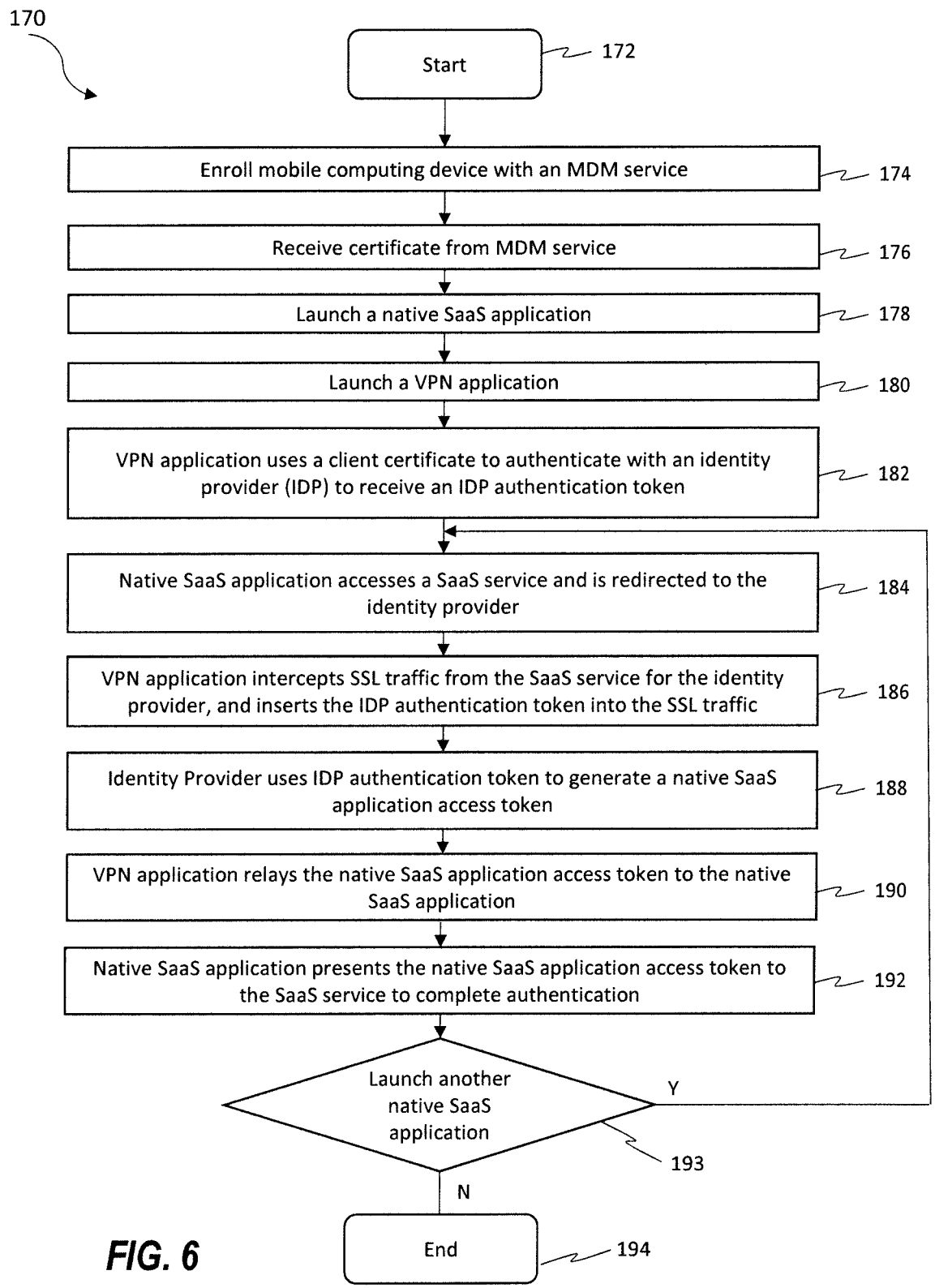
FIG. 6 is a more detailed flowchart illustrating a method for operating the mobile computing device illustrated in FIG. 3.

Generally speaking for the flowchart 120 in FIG. 5, a method for operating the mobile computing device 20 includes from the start (Block 122) launching one of the native SaaS applications 32, 34 at Block 124, and launching the VPN application 30 at Block 126 in response to the native SaaS application being launched.

The VPN application 30 authenticates with the identity provider 40 over path 100 at Block 128 to receive the IDP authentication token 31. The VPN application 30 intercepts traffic at Block 130 between a SaaS service 50 and a native SaaS application 32 over paths 102 and 104, and inserts the IDP authentication token 31 for the native SaaS application 32 authentication.

The IDP authentication token 31 is used to authenticate with the identity provider 40 over path 100 at Block 132 to generate a native SaaS application access token. The native SaaS application access token is provided to the SaaS service 50 over path 104 at Block 134 to complete authentication for the native SaaS application 32. A decision Block 136 asks if another native SaaS application is to be launch. If yes, then the process loops to the point before the VPN application 30 intercepts traffic at Block 130. Steps 130-134 are repeated for the second native SaaS application 34. If no, then the method ends at Block 138.

Referring now to the flowchart 170 in FIG. 6, more detailed steps for operating the mobile computing device 20 will be discussed. From the start (Block 172), the mobile computing device 20 is enrolled with an MDM service 82 over path 118 at Block 174.

An MDM enrolled mobile computing device 20 is able to receive delivery of certificates over path 118 from the MDM service 82 at Block 176. One of the certificates may be a root certificate that identifies a root certificate authority (CA) used by an MDM server for issuing client certificates and server certificates. A client certificate can be used by the VPN application 30 to authenticate with the identity provider 40. A server certificate is used by the VPN application 30 to intercept traffic from the first and second SaaS services 50, 60.

The first native SaaS application 32 is launch by the user at Block 178, and the VPN application 30 is launched at Block 178. The VPN application 30 is launched each time a third party native SaaS application is launched.

The VPN application 30 uses a client certificate to authenticate with the identity provider 40 over path 100 so as to receive an IDP authentication token 31 at Block 182. The client certificate avoids the need for the user to type in their credentials. If a client certificate is not available, then the user would have to type in their credentials.

The first native SaaS application 32 accesses a first SaaS service 50 over paths 102, 104 and is redirected to the identity provider 40 at Block 184. The SSL traffic between the first native SaaS application 32 and the SaaS service 50 flows through the VPN application 30.

The VPN application 30 is configured to operate as man-in-the-middle (MITM) for identity provider requests from SaaS services. For the VPN application 30 to successfully intercept the SSL traffic, the VPN application 30 presents an SSL server certificate of the identity provider to the third party native SaaS applications. Since the mobile computing device 20 trusts the root certificate authority that issued the SSL server certificate, the SSL certification chain is established. This allows the VPN application 30 to modify the SSL stream by inserting the IDP authentication token needed to authenticate to the identity provider 40.

A goal is to not keep prompting the user for credentials, and hence, a silent client certificate based authentication between the VPN application 30 and the identity provider 40 can be used initially to obtain an IDP authentication token 31 and then cached for subsequent use. A native SaaS application 32, 34 accesses the SaaS service 50, 60 and the identity provider 40. The VPN application 30 is intercepting traffic from the native SaaS application 32, 34 and is doing a man in the middle (MITM) for traffic to the identity provider 40. Doing a MITM requires the VPN application 30 to present the server certificate of the identity provider 40 to the native SaaS application 32, 34.

The VPN application 30 is configured to only intercept traffic directed to the identity provider 40 while passing traffic for other destinations as is. Mobile applications typically do cert-pinning, which prevents MITM attacks. However, because the VPN application 30 only intercepts traffic destined for the identity provider 40 associated with the enterprise network 80 (and no other services), cert-pinning can still be used for validating certificates of other services accessed by the mobile applications.

Referring back to the flowchart 170, after the VPN application 30 intercepts the SSL traffic for the identity provider 40, the IDP authentication token 31 is inserted into the SSL traffic at Block 186. The identity provider 40 now authenticates the user using the IDP authentication token 31. Upon authentication, the identity provider 40 provides the VPN application 30 with a first native SaaS application access token over path 100 at Block 188.

The VPN application 30 relays the first native SaaS application access token to the first native SaaS application 32 over path 102 at Block 190. The first native SaaS application 32 presents the first native SaaS application access token to the first SaaS service 50 over paths 102, 104 to complete authentication at Block 192. The authentication of the user for accessing the first SaaS service 50 is completed without having the user enter their credentials.

At decision Block 192, if the second native SaaS application 34 is to be launched, the process loops back up to where the second native SaaS application 34 assesses the second SaaS service 60 at Block 184. Steps 184-192 are repeated for the second native SaaS application 34 without the user having to enter his credentials. If no more native SaaS application are to be launched, then the method ends at Block 194.

Yet another aspect is directed to a non-transitory computer readable medium for operating a mobile computing device 20, and with the non-transitory computer readable medium having a plurality of computer executable instructions for causing the mobile computing device 20 to perform steps. The steps include launching a first native SaaS application 32 based on user input, launching a VPN application 30 in response to the first native SaaS application 32 being launched, and operating the VPN application 30 to authenticate with an identity provider 40.

The identity provider 40 provides an IDP authentication token 31 to the VPN application 30 upon authentication. The first native SaaS application 32 is operated to access a first SaaS service 50, with the first SaaS service 50 redirecting the first native SaaS application 32 to the identity provider 40 for authentication.

The VPN application 30 is operated to intercept traffic from the first native SaaS application 32 to the identity provider 40, with the VPN application 30 modifying the traffic by inserting the IDP authentication token 31 to be presented to the identity provider 40 without requiring the user to login for authentication.

The identity provider 40 provides a first native SaaS application access token to the VPN application 30 upon authentication. The VPN application 30 then provides the first SaaS application access token to the first native SaaS application 32. The first native SaaS application 32 is operated to provide the first SaaS application access token to the first SaaS service 50 to complete authentication.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A mobile computing device comprising:
a memory and a processor cooperating with said memory to perform the following:
launch a first native software as a service (SaaS) application based on user input,
launch a virtual private network (VPN) application in response to the first native SaaS application being launched,
operate the VPN application to authenticate with an identity provider (IDP), with the identity provider providing an IDP authentication token to the VPN application upon authentication,
operate the first native SaaS application to access a first SaaS service, with the first SaaS service redirecting the first native SaaS application to the identity provider for authentication,
operate the VPN application to only intercept traffic from the first native SaaS application to the identity provider while passing traffic for other destinations as is, with the VPN application modifying the traffic by inserting the IDP authentication token to be presented to the identity provider without requiring the user to login for authentication, with the identity provider providing a first native SaaS application access token to the VPN application upon authentication, and with the VPN application then providing the first SaaS application access token to the first native SaaS application, and
operate the first native SaaS application to provide the first SaaS application access token to the first SaaS service to complete authentication.

2. The mobile computing device according to claim 1 wherein said processor is further configured to perform the following:
launch a second native SaaS application based on user input;
operate the second native SaaS application to access a second SaaS service, with the second SaaS service redirecting the second native SaaS application to the identity provider for authentication;
operate the VPN application to intercept traffic from the second native SaaS application to the identity provider, with the VPN application modifying the traffic by inserting the IDP authentication token to be presented to the identity provider without requiring the user to login for authentication, with the identity provider providing a second SaaS application access token to the VPN upon authentication, and with the VPN application then providing the second SaaS application access token to the second native SaaS application, and
operate the second native SaaS application to provide the second SaaS application access token to the second SaaS service to complete authentication.

3. The mobile computing device according to claim 1 wherein a session for the first native SaaS application has expired, and wherein said processor is further configured to perform the following:
  re-launch the first native SaaS application based on user input;
  operate the first native SaaS application to access the first SaaS service, with the first SaaS service redirecting the first native SaaS application to the identity provider for authentication;
  operate the VPN application to intercept traffic from the first native SaaS application to the identity provider, with the VPN application modifying the traffic by inserting the IDP authentication token to be presented to the identity provider without requiring the user to login for authentication, with the identity provider providing a new first SaaS application access token to the VPN upon authentication, and with the VPN application then providing the new first SaaS application access token to the first native SaaS application; and
  operate the first native SaaS application to provide the new first SaaS application access token to the first SaaS service to complete re-authentication.

4. The mobile computing device according to claim 1 wherein the VPN application uses a client certificate to authenticate with the identity provider so as to receive the IDP authentication token.

5. The mobile computing device according to claim 1 wherein the VPN application uses the user's login information to authenticate with the identity provider so as to receive the IDP authentication token.

6. The mobile computing device according to claim 1 wherein the VPN application presents a server certificate when intercepting traffic from the first SaaS service.

7. The mobile computing device according to claim 1 wherein the traffic is based on a secure sockets layer (SSL) protocol.

8. The mobile computing device according to claim 1 wherein the mobile computing device is enrolled with a mobile device management (MDM) service.

9. A method for operating a mobile computing device comprising:
  launching a first native software as a service (SaaS) application based on user input;
  launching a virtual private network (VPN) application in response to the first native SaaS application being launched;
  operating the VPN application to authenticate with an identity provider (IDP), with the identity provider providing an IDP authentication token to the VPN application upon authentication;
  operating the first native SaaS application to access a first SaaS service with the first SaaS service redirecting the first native SaaS application to the identity provider for authentication;
  operating the VPN application to only intercept traffic from the first native SaaS application to the identity provider while passing traffic for other destinations as is with the VPN application modifying the traffic by inserting the IDP authentication token to be presented to the identity provider without requiring the user to login for authentication, with the identity provider providing a first native SaaS application access token to the VPN application upon authentication, and with the VPN application then providing the first SaaS application access token to the first native SaaS application; and
  operating the first native SaaS application to provide the first SaaS application access token to the first SaaS service to complete authentication.

10. The method according to claim 9 further comprising:
  launching a second native SaaS application based on user input;
  operating the second native SaaS application to access a second SaaS service, with the second SaaS service redirecting the second native SaaS application to the identity provider for authentication;
  operating the VPN application to intercept traffic from the second native SaaS application to the identity provider, with the VPN application modifying the traffic by inserting the IDP authentication token to be presented to the identity provider without requiring the user to login for authentication, with the identity provider providing a second SaaS application access token to the VPN upon authentication, and with the VPN application then providing the second SaaS application access token to the second native SaaS application; and
  operating the second native SaaS application to provide the second SaaS application access token to the second SaaS service to complete authentication.

11. The method according to claim 9 wherein a session for the first native SaaS application has expired, and further comprising:
  re-launching the first native SaaS application based on user input;
  operating the first native SaaS application to access the first SaaS service, with the first SaaS service redirecting the first native SaaS application to the identity provider for authentication;
  operating the VPN application to intercept traffic from the first native SaaS application to the identity provider after the first native SaaS application has been redirected to the identity provider, with the VPN application modifying the traffic by inserting the IDP authentication token to be presented to the identity provider without requiring the user to login for authentication, with the identity provider providing a new first SaaS application access token to the VPN upon authentication, and with the VPN application then providing the new first SaaS application access token to the first native SaaS application; and
  operating the first native SaaS application to provide the new first SaaS application access token to the first SaaS service to complete re-authentication.

12. The method according to claim 9 wherein the VPN application uses a client certificate to authenticate with the identity provider so as to receive the IDP authentication token.

13. The method according to claim 9 wherein the VPN application uses the user's login information to authenticate with the identity provider so as to receive the IDP authentication token.

14. A non-transitory computer readable medium for operating a mobile computing device, and with the non-transitory computer readable medium having a plurality of computer executable instructions for causing the mobile computing device to perform steps comprising:
  launching a first native software as a service (SaaS) application based on user input;
  launching a virtual private network (VPN) application in response to the first native SaaS application being launched;
  operating the VPN application to authenticate with an identity provider (IDP), with the identity provider providing an IDP authentication token to the VPN application upon authentication;

operating the first native SaaS application to access a first SaaS service, with the first SaaS service redirecting the first native SaaS application to the identity provider for authentication;

operating the VPN application to only intercept traffic from the first native SaaS application to the identity provider while passing traffic for other destinations as is, with the VPN application modifying the traffic by inserting the IDP authentication token to be presented to the identity provider without requiring the user to login for authentication, with the identity provider providing a first native SaaS application access token to the VPN application upon authentication, and with the VPN application then providing the first SaaS application access token to the first native SaaS application; and operating the first native SaaS application to provide the first SaaS application access token to the first SaaS service to complete authentication.

15. The non-transitory computer readable medium according to claim 14 further comprising:

launching a second native SaaS application based on user input;

operating the second native SaaS application to access a second SaaS service, with the second SaaS service redirecting the second native SaaS application to the identity provider for authentication;

operating the VPN application to intercept traffic from the second native SaaS application to the identity provider, with the VPN application modifying the traffic by inserting the IDP authentication token to be presented to the identity provider without requiring the user to login for authentication, with the identity provider providing a second SaaS application access token to the VPN upon authentication, and with the VPN application then providing the second SaaS application access token to the second native SaaS application; and operating the second native SaaS application to provide the second SaaS application access token to the second SaaS service to complete authentication.

16. The non-transitory computer readable medium according to claim 14 wherein the VPN application uses a client certificate to authenticate with the identity provider so as to receive the IDP authentication token.

17. The non-transitory computer readable medium according to claim 14 wherein the VPN application uses the user's login information to authenticate with the identity provider so as to receive the IDP authentication token.

* * * * *